US009660556B2

(12) United States Patent
Yamamoto

(10) Patent No.: US 9,660,556 B2
(45) Date of Patent: May 23, 2017

(54) LINEAR ULTRASONIC MOTOR AND OPTICAL APPARATUS INCLUDING THE SAME

(71) Applicant: CANON KABUSHIKI KAISHA, Tokyo (JP)

(72) Inventor: Harushige Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 14/219,185

(22) Filed: Mar. 19, 2014

(65) Prior Publication Data
US 2014/0285066 A1 Sep. 25, 2014

(30) Foreign Application Priority Data

Mar. 21, 2013 (JP) ................................ 2013-058769

(51) Int. Cl.
 H02N 2/02 (2006.01)
 H02N 2/00 (2006.01)
 G02B 7/10 (2006.01)
(52) U.S. Cl.
 CPC ............. *H02N 2/026* (2013.01); *G02B 7/102* (2013.01); *H02N 2/006* (2013.01)
(58) Field of Classification Search
 CPC ......... H02N 2/103; H02N 2/026; H02N 2/163
 USPC ...................... 310/323.02, 323.09
 See application file for complete search history.

(56) References Cited

U.S. PATENT DOCUMENTS

| 5,698,929 A | 12/1997 | Seki et al. |
| 6,085,990 A | 7/2000 | Augustin |
| 6,218,767 B1 | 4/2001 | Akada et al. |
| 7,999,439 B2 | 8/2011 | Sakamoto |

(Continued)

FOREIGN PATENT DOCUMENTS

| CN | 101207343 A | 6/2008 |
| CN | 101946396 A | 1/2011 |

(Continued)

OTHER PUBLICATIONS

Office Action in Chinese Patent Application No. 201410106656.1, dated Oct. 26, 2015.

*Primary Examiner* — Shawki S Ismail
*Assistant Examiner* — Bryan Gordon
(74) *Attorney, Agent, or Firm* — Fitzpatrick, Cella, Harper & Scinto

(57) ABSTRACT

A small linear ultrasonic motor includes: a vibration element generating ultrasonic vibrations by applying high frequency drive voltage; a slider against which vibration element is pressed and which is relatively moved by the ultrasonic vibrations; a vibration element supporting member retaining the vibration element and relatively moving with respect to the slider; a guide portion guiding a moving direction of the relative movement of the vibration element supporting member; and a pressurizing portion pressing the vibration element against the slider, wherein the guide portion is arranged sandwiching a position at which the vibration element is pressed against the slider, in a plane that includes the moving direction and intersects with a pressurizing direction of a pressurizing force exerted by the pressurizing portion, and at least each part of the pressurizing portion and the guide portion is disposed at a position equidistant from the plane in the pressurizing direction.

28 Claims, 4 Drawing Sheets

(56) References Cited

U.S. PATENT DOCUMENTS

| | | | |
|---|---|---|---|
| 2006/0061235 A1* | 3/2006 | Funakubo | H01L 41/0913 310/323.16 |
| 2006/0113868 A1* | 6/2006 | Sakatani | G02B 7/08 310/323.17 |
| 2008/0036333 A1* | 2/2008 | Funakubo | H01L 41/0471 310/323.02 |
| 2008/0174206 A1* | 7/2008 | Sakamoto | H02N 2/004 310/323.09 |
| 2009/0267454 A1 | 10/2009 | Takizawa | |
| 2010/0148629 A1 | 6/2010 | Bexell et al. | |
| 2011/0031847 A1* | 2/2011 | Sakamoto | H02N 2/026 310/323.02 |

FOREIGN PATENT DOCUMENTS

| | | |
|---|---|---|
| JP | 06-6986 A | 1/1994 |
| JP | 06-284755 A | 10/1994 |
| JP | 09-285152 A | 10/1997 |
| JP | 2001-292584 A | 10/2001 |
| JP | 2007-097317 A | 4/2007 |
| JP | 2007-209088 A | 8/2007 |

\* cited by examiner

LINEAR ULTRASONIC MOTOR AND OPTICAL APPARATUS INCLUDING THE SAME

BACKGROUND OF THE INVENTION

Field of the Invention

The present invention relates to an ultrasonic motor, in particular to a linear drive ultrasonic motor and to an optical apparatus including the same.

Description of the Related Art

A technique has been known where, in a conventional linear drive ultrasonic motor (hereinafter, called a linear ultrasonic motor), a piezoelectric element for generating periodical vibrations in an ultrasonic range by applying a high frequency voltage is adopted as a vibration element, and a slide member pressed thereagainst is driven by the vibrations.

For instance, as a linear ultrasonic motor, a configuration disclosed in Japanese Patent Application Laid-Open No. 2001-292584 is exemplified. This configuration has a function of supporting a vibration node portion of a vibration body (a vibration element in the present invention), and a function of pressurizing the vibration body to cause a frictional force between the vibration body and a rail (a slide member in the present invention). These functions are achieved by using one spring member and a plurality of rubber sheets and incorporating the spring member between a fixing plate and the vibration body via the rubber sheets The vibration element is pressed against the rail. As a result, ultrasonic vibrations of the vibration body frictionally drive the rail. At this time, a rotational member is arranged on a surface of the rail opposite to a portion in contact with the vibration body, and supports the rail such that the rail can move while reducing the sliding resistance of the rail. The rail is thus sandwiched between the vibration body and the rotational member, thereby achieving a configuration where the pressure contact power is closed between the fixing plate and the rail.

In the case of adopting a configuration as disclosed in Japanese Patent Application Laid-Open No. 2001-292584, the rotational member, the rail, the vibration body, the spring member and the fixing plate are arranged in series in the pressurizing direction. This arrangement causes a problem of increasing the thickness of a motor including a drive unit and a unit to be driven.

SUMMARY OF THE INVENTION

The present invention has been made In view of such a problem, and has an object to achieve a compact linear ultrasonic motor with a reduced thickness in the pressurizing direction.

To achieve the object, the present invention is a linear ultrasonic motor, including: a vibration element that generates ultrasonic vibrations by an applied high frequency drive voltage; a slider against which the vibration element is pressed and which is relatively moved by the ultrasonic vibrations; a vibration element supporting member that retains the vibration element, and relatively moves with respect to the slider; a guide portion that guides a moving direction of the relative movement of the vibration element supporting member; and a pressurizing portion that presses the vibration element against the slider, wherein the guide portion is arranged sandwiching a position at which the vibration element is pressed against the slider, in a plane that includes the moving direction and intersects with a pressurizing direction of a pressurizing force exerted by the pressurizing portion, and at least each part of the pressurizing portion and the guide portion is disposed at a position equidistant from the plane in the pressurizing direction.

The present invention can provide a linear ultrasonic motor that achieves reduction in thickness in the pressurizing direction without reducing the output, drive efficiency, and the amount of driving.

Further features of the present invention will become apparent from the following description of exemplary embodiments with reference to the attached drawings.

BRIEF DESCRIPTION OF THE DRAWINGS

FIG. 2A is a principal perspective view.

DESCRIPTION OF THE EMBODIMENTS

Preferred embodiments of the present invention will now be described in detail in accordance with the accompanying drawings.

A linear ultrasonic motor to be described below is an example in the case where the motor is used as an actuator for driving a lens retaining member of a digital camera and is packaged as a unit. However, a usage mode of the present invention is not limited thereto.

Figure 1:
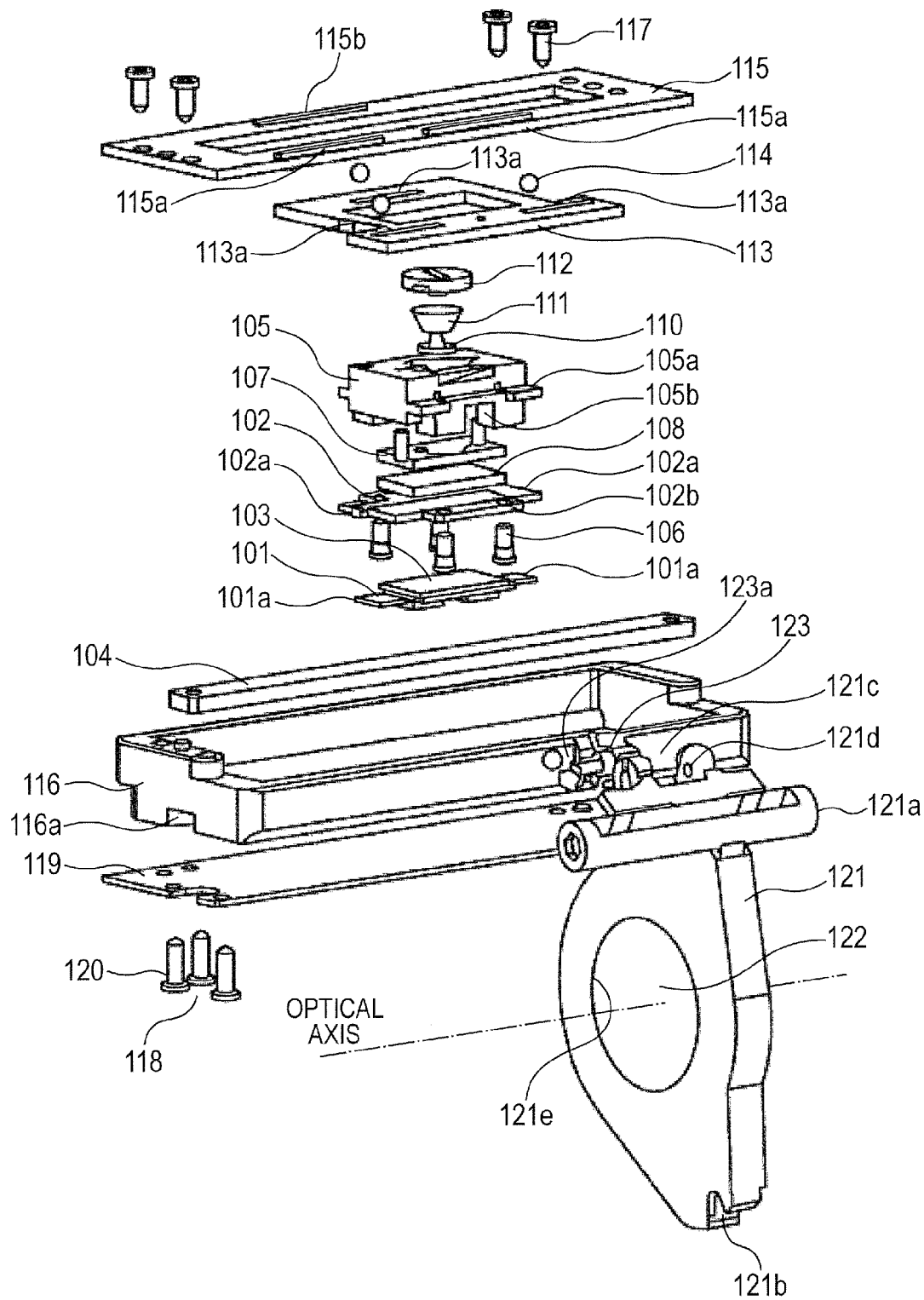
FIG. 1 illustrates a mode where a linear ultrasonic motor according to an embodiment of the present invention is adopted in a digital camera, and is a principal perspective view of a focus drive mechanism.
Figure 2A:
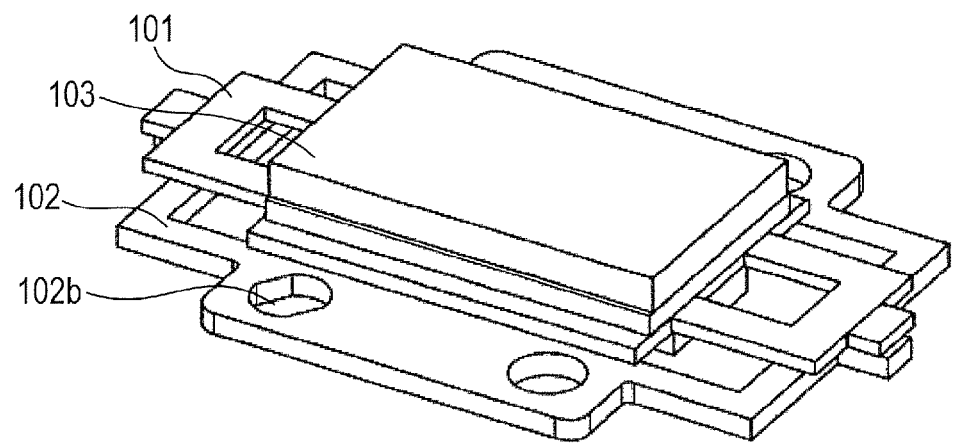
FIGS. 2A and 2B are diagrams illustrating positional relationships between a vibration element, a connecting member and a piezoelectric element in the embodiment illustrated in FIG. 1.
Figure 2B:
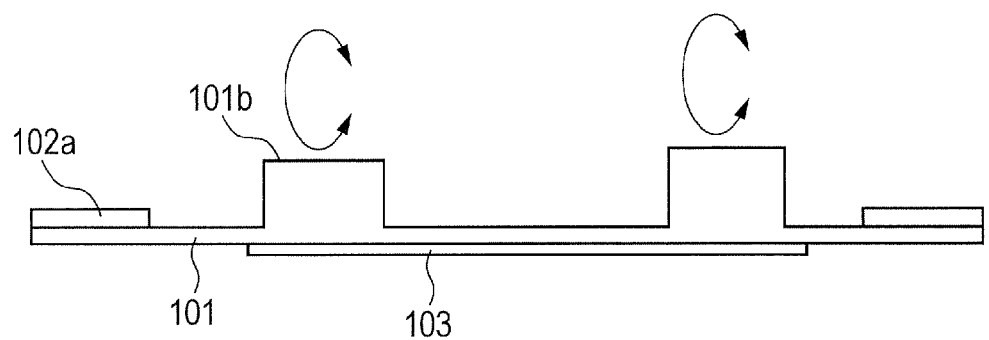
Figure 3:
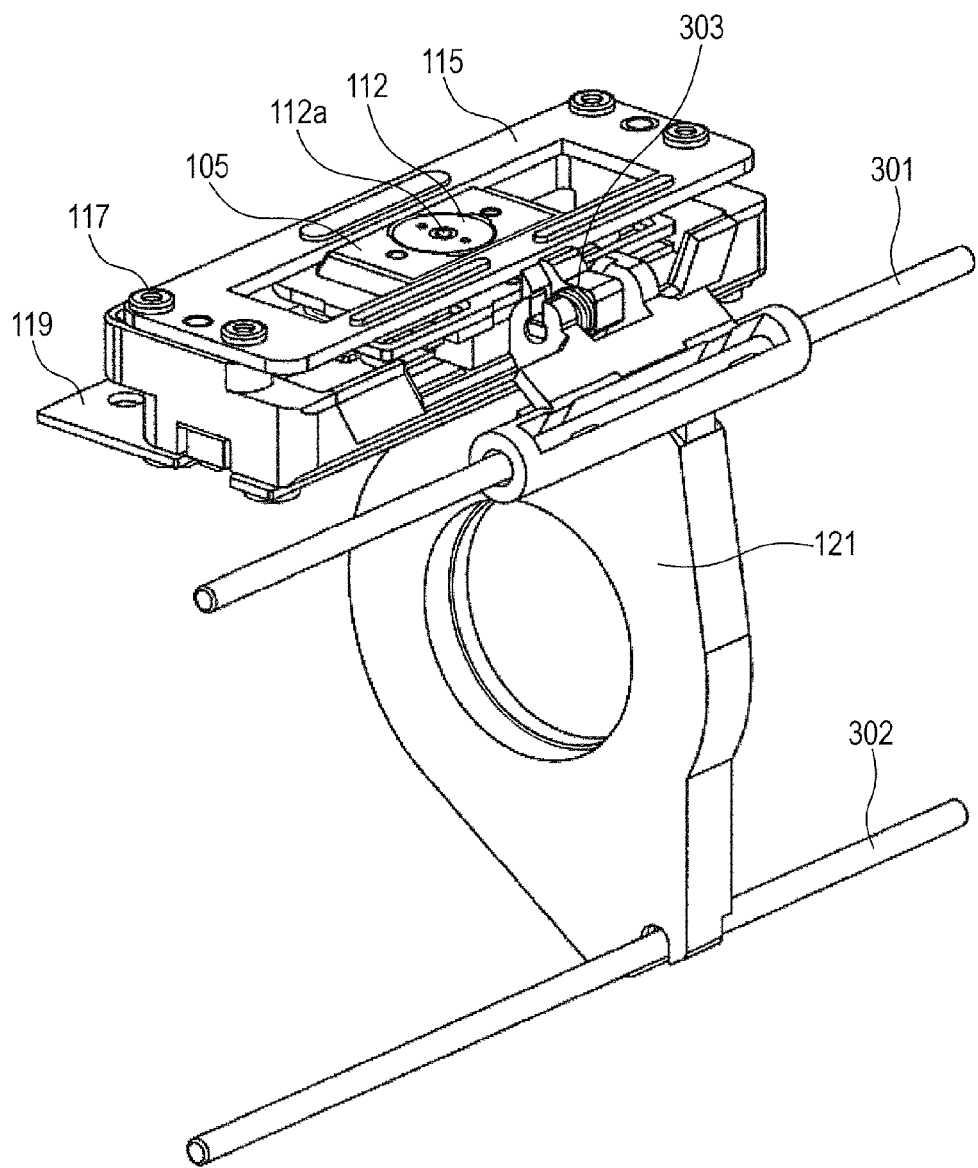
FIG. 3 is a principal perspective view illustrating an entire mechanism of driving a lens retaining member in which the linear ultrasonic motor is incorporated, in the embodiment illustrated in FIG. 1.
Figure 4:
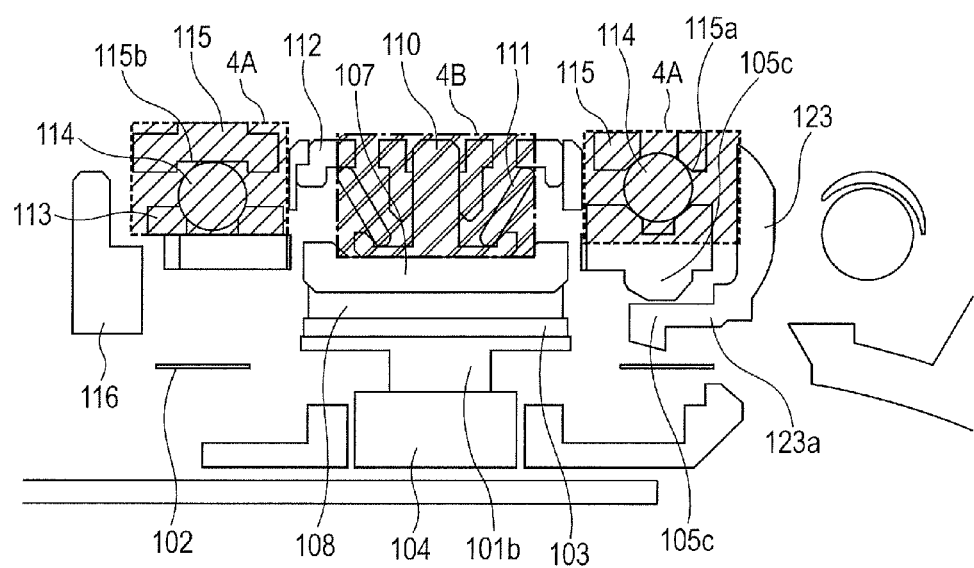
FIG. 4 is a sectional view taken along a direction that passes through the center of a pressurizing spring and is perpendicular to the optical axis in the configuration illustrated in FIG. 3.

In this specification, to clarify the structure and operations of the linear ultrasonic motor, description is made with the same reference numerals assigned to the same components in the drawings. The direction along the after-mentioned optical axis O is defined as the X-axis. The direction along the normal of a portion of the vibration element that is to be in contact is defined as the Z-axis. The direction perpendicular to the X-axis and the Z-axis is defined as the Y-axis. Thus, after-mentioned FIGS. 1, 2A and 3 are represented as three-dimensional diagram with X, Y and Z-axes. FIG. 2B is represented as a two-dimensional plan views with an X-Z coordinate system. FIG. 4 is represented as a two-dimensional plan view with a Y-Z coordinate system. These coordinate systems concerning X, Y and Z are for convenience for illustration. The actual invention is not limited by these definitions.

Embodiment 1

FIG. 1 is a principal perspective view illustrating a linear ultrasonic motor that is an embodiment of the present invention and used as a focus drive mechanism applied to a digital camera. A vibration plate 101 is fixed, at portions 101a to be in contact, to respective contact portions 102a of a connecting member 102 by welding. A vibration element includes the vibration plate 101, the connecting member 102 and a piezoelectric element 103.

FIG. 2A is a principal perspective view illustrating the vibration element including the vibration plate 101, the connecting member 102 and the piezoelectric element 103. As illustrated in FIG. 2A, the piezoelectric element 103 is fixed to the vibration plate 101 with a publicly known adhesive. The piezoelectric element 103 is configured such that application of a high frequency voltage resonates the vibration plate 101 in the longitudinal direction, which is the X-axis direction, and the short direction, which is the Y-axis direction. As a result, as indicated by arrows in FIG. 2B, distal ends of pressure contact portions 101*b* formed on the vibration plate 101 cause spheroidal motions. Desired motions can be generated by changing the frequency and phase of the high frequency voltage to be applied to the piezoelectric element 103 to thereby appropriately change the rotational directions and spheroidal ratios of the spheroidal motion. That is, application of the high frequency drive voltage causes the vibration element to generate ultrasonic vibrations. The pressure contact portions 101*b* are pressed against a slider that serves as a corresponding component and functions as a relative slide member (reference numeral 104 in FIG. 1). The spheroidal motions of the pressure contact portions 101*b* are transmitted as frictional force and then as driving force to the slider 104, which is in contact. Accordingly, the slider 104 can be relatively moved along the optical axis O (X-axis in the diagram) with respect to the vibration element by the ultrasonic vibrations. A vibration element supporting member that supports the vibration element also relatively moves with respect to the slider 104, through the vibration element.

FIG. 1 illustrates the vibration element supporting member 105. The connecting member 102, to which vibration plate 101 is fixed, is fixed at screw fit portions 102*b* with four respective screws 106 to a prescribed position. A pressurizing 107 is configured so as to press and retain the piezoelectric element 103 with an after-mentioned elastic member 108 intervening therebetween. The elastic member 108 can be a sheet-like component that is made of, for instance, rubber, and has a uniform thickness. This arrangement of the elastic member 108 can exert an advantageous effect of appropriately distributing a pressurizing force applied to the vibration element by an after-mentioned pressurizing plate 107.

The diagram illustrates a pressurizing spring retaining member 110, a pressurizing spring 111, and a pressurizing spring base plate 112. The pressurizing spring retaining member 110 and the pressurizing spring base plate 112 are arranged in a state where pressurizing spring 111 intervenes therebetween. The pressurizing spring base plate 112 supports one end of the pressurizing spring 111. The pressurizing spring retaining member 110 supports the other end of the pressurizing spring 111. A part of the pressurizing spring retaining member is fitted into the pressurizing spring 111. Thus, the pressurizing spring 111 is stably sandwiched between the pressurizing spring base plate 112 and the pressurizing spring retaining member 110.

It is configured such that the pressurizing spring 111 can expand and contract in the Z-axis, which is a pressurizing direction, between the pressurizing spring base plate 112 and the pressurizing spring retaining member 110. The pressurizing spring base plate 112 is in contact with a surface of the vibration element supporting member 105 that faces a portion supporting the pressurizing spring 111, thereby regulating the movement in the pressurizing direction. In this embodiment, what is called a disc spring having a through hole at the center for acquiring a pressurizing force is adopted. However, the configuration is not limited thereto. Alternatively, any configuration may be adopted only if a compressed state is secured after attachment, which will be described later. It is preferable that movement of the spring can be regulated in all directions other than the pressurizing direction by penetration of a part of the pressurizing spring retaining member 110 into the through hole. The penetration achieves desired pressurizing force. Alternatively, the configuration may be replaced with another configuration with an elastic member in view of cost and space.

A movement plate 113 configures a part of a guide portion fixed to abutment portions 105*a* of the vibration element supporting member 105. Balls 114, which are rolling members, are fitted into the movement plate 113. V-groove portions 113*a* that extend in the X-axis at three positions guide the vibration element supporting member 105 in the optical axis direction. The V-groove portions 113*a* have a V-shaped section in a Y-Z plane, and are arranged in parallel to the relative movement direction of the vibration element. A cover plate 115 is fixed to a unit base plate 116 with screws 117.

The cover plate 115 also configures a part of the guide portion, and sandwiches the balls 114 with V-groove portions 115*a* and a planar portion 115*b* (see FIG. 4) provided at positions facing the V-groove portions 113*a* of the movement plate 113. The V-groove portions 115*a* have a V-shaped section in the Y-Z plane. The planar portion 115*b* has a section of a flat undersurface that faces the V-shaped groove of the V-groove portion 113*a* and extends in the X-Y plane. Thus, the vibration element supporting member 105 can be supported movably forward and backward in the optical axis direction without looseness.

In this embodiment, the guide portion can sandwich a position where the vibration element is in pressure contact with the slider, in a plane (X-Y plane) that contains the X-axis, which is the relative movement direction, and intersects with the pressurizing direction (Z-axis) on the vibration element by the pressurizing portion. The plane is not limited to the X-Y plane. The plane may be appropriately inclined according to a mode of using the linear ultrasonic motor. The guide portion can include: the V-groove portions 113*a* arranged in the configuration of a side fixed to the vibration element supporting member 105; and a holding member that has corresponding grooves including the V-groove portions 115*a* and the planar portion 115*b*, which are arranged at positions facing the V-groove portions 113*a*. The shapes of the grooves are appropriate for facilitating fabrication and achieving a low frictional feature in the case of adopting the balls 114 as the rolling members. Alternatively, the shapes may be other shapes in conformity with the structures of the rolling members. The guide portion also includes the rolling members. As in this embodiment, three pairs of the V-groove portion and the corresponding groove can be appropriately arranged such that two pairs are arranged on the same line in the moving direction, and another pair is further arranged at a position other than the positions for the two pairs, centered at the pressurizing portion on the foregoing plane. This arrangement suppresses what is called looseness during relative movement. However, the number of pairs may be increased for covering the distance for relative movement.

The slider 104 is fixed with a screw 118 to a slider incorporating portion 116*a* of the unit base plate 116. A unit retaining plate 119 is fixed with screws 120 to the undersurface of the unit base plate 116. This assembly is fixed by publicly known screws or adhesion to a base plate fixation portion, not illustrated, of a photographing apparatus, e.g., a digital camera. The configuration so far is a completion of a motor unit of the linear ultrasonic motor according to the present invention.

Next, a method of connection with a lens retaining member that retains an optical lens is described. A lens retaining member 121 configures a part of a focusing lens or a zoom lens of a digital camera. An optical lens 122 is fixed to a fit portion 121e. The lens retaining member 121 includes a fit hole 121a and a stabilizer fit portion 121b. The fit hole 121a is fitted with a guide bar (reference numeral 301 in FIG. 3) in a relatively slidable manner. The stabilizer fit portion 121b is fitted with a stabilizer bar (reference numeral 302 in FIG. 3) in a relatively slidable manner, and regulates rotation of the lens retaining member about the guide bar. The foregoing configuration allows the lens retaining member 121 to move forward and backward in the optical axis direction. A rack retainer 121c is further formed in the lens retaining member 121. A publicly known rack 123 is incorporated in this retainer.

The rack 123 is rotationally urged in a clockwise direction in the diagram by an operation of to publicly known compression torsion spring (reference numeral 303 in FIG. 3) in a state of being incorporated in the lens retaining member 121. At the same time the compression torsion spring presses the rack 123 against a contact hole 121d of the lens retaining member 121 to support the rack, thereby absorbing the looseness of the rack 123 in the optical axis direction. As a result, the rack 123 is integrated with the lens retaining member 121 and moves forward and backward in the optical axis direction.

In the incorporated state, the distal contact portion 123a of the rack 123 is fitted with a contact protrusion 105c (see FIG. 4) formed at a rack incorporating portion 105b of the vibration element supporting member 105.

The configuration so far is a completion of a mechanism for driving the lens retaining member 121 in which the linear ultrasonic motor of this embodiment is incorporated. FIG. 3 is a principal perspective view illustrating the entire mechanism for driving the lens retaining member in which the linear ultrasonic motor is incorporated. The same symbols that are identical to the symbols used in the description with reference to FIG. 1 are assigned to the configurational components in the diagram.

FIG. 4 is a sectional view in a plane that passes through the center of the pressurizing spring 111 in FIG. 3 and extends in directions perpendicular to the optical axis. Also in the configurational components illustrated in this diagram, symbols identical to the symbols used for the description with reference to FIG. 1 are assigned to configurational components illustrated in this diagram. Areas including the movement plate 113, the balls 114 and the cover plate 115, which configure the guide portion, are illustrated as areas 4A (hatched part) in this diagram. The guide portion guides movement in the moving direction during relative movement of the vibration element supporting member 105 with respect to the slider 104. An area including the pressurizing spring retaining member 110, the pressurizing spring 111 and the pressurizing spring base plate 112, which configure the pressurizing portion, is illustrated as an area 4B (unevenly hatched part) in this diagram. The pressurizing portion presses the vibration element against the slider 104, as described above. These areas 4A and area 4B are arranged such that at least each part thereof is disposed at the same height in the pressurizing direction. In other words, at least each part thereof is equidistant from the plane (X-Y plane in this example) that includes the X-axis and the portion in contact of the vibration element, in the pressurizing portion and the guide portion. The plane may be appropriately inclined about the X-axis according to a mode of using the linear ultrasonic motor, as described above. The elastic member 108 may appropriately have a shorter distance from the plane than the distances of the guide portion and the pressurizing portion from the plane. Accordingly, dispersion of the pressure by the elastic member 108 and to an unintentional direction can be suppressed. The foregoing configuration can construct the actuator including the linear ultrasonic motor that achieves reduction in thickness of the drive unit.

As described above, the state where the configurational components are incorporated, the pressurizing spring 111 pressurizes the pressurizing plate 107 via the pressurizing spring retaining member 110, as illustrated in FIG. 4. The pressurizing force further compresses the elastic member 108, and generates a force of urging the piezoelectric element 103 and the vibration plate 101 via the elastic member 108 in the lower direction in the diagram.

As described above, in the vibration plate 101, the portions 101a to be in contact are fixed by welding to the contact portions 102a of the connecting member 102, and the screw fit portions 102b of the connecting member are fixed by the screws 106 to the vibration element supporting member 105. At this time, application of a pressurizing force to the vibration plate 101 and the piezoelectric element 103 presses the distal ends of the pressure contact portions 101b of the vibration plate 101 against the slider 104. In this embodiment, the connecting member 102 is made of an elastic material having a thickness of about 0.1 mm. Accordingly, when the pressurizing force is applied, deformation occurs almost with no resistance in the pressurizing direction, and the pressurizing force of the pressurizing spring 111 is applied to the vibration plate 101 almost with no change in magnitude.

In this state, as described above, application of a high frequency voltage to the piezoelectric element 103 resonates the vibration plate 101 in the longitudinal direction and the short direction. As a result, the connecting member 102, to which the vibration plate 101 is fixed by welding, and the vibration element supporting member 105, to which the connecting member 102 is fixed, relatively move forward and backward in the optical axis direction with respect to the rail 104. As described above, the movement is transmitted to the rack 123 via the contact protrusion 105c, which is formed on the rack incorporating portion 105b of the vibration element supporting member 105. The foregoing operations move the lens retaining member 121 forward and backward along the optical axis, thereby allowing, for instance, a focusing operation of a photographic lens of a digital camera.

Thus, the specific example of the linear drive ultrasonic motor according to the present invention has been described in detail. However, the present invention is not limited to the embodiment. Alternatively, any mode can be adopted only if within a scope described in claims.

For instance, the present invention can be used for controlling a focusing lens of an optical apparatus. This usage can also exert advantageous effects of improving controllability and reliability of an optical apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-058769, filed Mar. 21, 2013, which is hereby incorporated by reference herein in its entirety.

What is claimed is:

1. An actuator, comprising:
a vibration element that generates vibrations by applying a drive signal;
a slider against which the vibration element is pressed and which enables relative movement with the vibration element by the vibrations;
a supporting member that retains the vibration element, and supports the relative movement with the slider;
guide portions that guide, by using rolling members, the relative movement between the supporting member and the slider in a direction of the relative movement between the supporting member and the slider; and
a pressing portion that presses the vibration element against the slider in a pressing direction so that the vibration element and the slider contact each other at a contact plane,
wherein the pressing portion is arranged so that at least a part of the pressing portion and at least a part of the rolling members are arranged in a plane parallel to the contact plane and the pressing portion is located between the rolling members.

2. The actuator according to claim 1, wherein each of the guide portions comprises a first groove portion arranged on a side of the supporting member, a holding member that has a second groove portion formed at a position facing the first groove portion; and at least one of the rolling members sandwiched between the first groove portion and the second groove portion.

3. The actuator according to claim 2, wherein at least three pairs of the first groove portion and the second groove portion are arranged around the pressing portion.

4. The actuator according to claim 3, wherein each of the second groove portions has a flat undersurface.

5. The actuator according to claim 3, wherein the pairs of the first groove portion and the second groove portion are arranged along the direction of the relative movement.

6. The actuator according to claim 1, wherein the pressing portion applies a pressing force to the vibration element with an elastic member.

7. The actuator according to claim 6, wherein the elastic member is made of a sheet-like member.

8. The actuator according to claim 1, wherein the pressing portion comprises a spring compressed in the pressing direction.

9. The actuator according to claim 8, wherein the spring has a through-hole in the pressing direction, and the pressing portion has a regulating member that penetrates the through-hole to regulate movement of the spring in a direction other than the pressing direction.

10. An optical apparatus, comprising an optical member driven by the actuator according to claim 1.

11. The actuator according to claim 1, wherein the vibration element generates ultrasonic vibrations by the drive signal for the relative movement.

12. The actuator according to claim 3, wherein the pairs of the first and second groove portions are arranged in a line.

13. An actuator, comprising:
a vibration element that generates vibrations by applying a drive signal;
a slider against which the vibration element is pressed and which enables relative movement with the vibration element by the vibrations;
a supporting member that retains the vibration element, and supports the relative movement with the slider;
guide portions that guide, by using rolling members, the relative movement between the supporting member and the slider in a direction of the relative movement between the supporting member and the slider; and
an elastic member that applies a pressing force in a pressing direction so that the vibration element and the slider are pressed to each other at a contact plane,
wherein at least a part of the elastic member and at least a part of the rolling members are arranged in a plane parallel to the contact plane.

14. The actuator according to claim 13, wherein each of the guide portions comprises a first groove portion arranged on a side of the supporting member; a holding member that has a second groove portion formed at a position facing the first groove portion; and at least one of the rolling members sandwiched between the first groove portion and the second groove portion.

15. The actuator according to claim 14, wherein at least three pairs of the first groove portion and the second groove portion are arranged around the elastic member.

16. The actuator according to claim 15, wherein each of the second groove portions has a flat undersurface.

17. The actuator according to claim 16, wherein the pairs of the first groove portion and the second groove portion are arranged along a line.

18. The actuator according to claim 15, wherein the pairs of the first groove portion and the second groove portion are arranged along the moving direction of the relative movement.

19. The actuator according to claim 13, wherein the elastic member is made of a sheet-like member.

20. The actuator according to claim 13, wherein the elastic member is a spring.

21. An optical apparatus, comprising an optical member driven by the actuator according to claim 13.

22. The actuator according to claim 13, wherein the vibration element generates ultrasonic vibrations by the drive signal for the relative movement.

23. The actuator according to claim 1, wherein the pressing portion and the rolling members are laterally arranged with respect to the pressing direction.

24. The actuator according to claim 13, wherein the the elastic member and the rolling members are laterally arranged with respect to the pressing direction.

25. The actuator according to claim 1, wherein the pressing portion is arranged so that at least part of the pressing portion and the rolling members are equidistant from a plane that includes the contact plane in the pressing direction.

26. The actuator according to claim 13, wherein the pressing portion is arranged so that at least part of the elastic member and the rolling members are equidistant from a plane that includes the contact plane in the pressing direction.

27. The actuator according to claim 1, wherein the direction of the relative movement is within the contact plane.

28. The actuator according to claim 13, wherein the direction of the relative movement is within the contact plane.

* * * * *